(12) United States Patent
Choi et al.

(10) Patent No.: US 12,551,836 B2
(45) Date of Patent: Feb. 17, 2026

(54) AIR FILTER AND AIR PURIFIER COMPRISING SAME

(71) Applicant: COWAY CO., LTD., Gongju-si (KR)

(72) Inventors: Yoon Hyuck Choi, Seoul (KR); Hyun Kyu Lee, Seoul (KR); Jong Cheol Kim, Seoul (KR); Seung Ki Kim, Seoul (KR); Sung Sil Kang, Seoul (KR); Ju Hyun Baek, Seoul (KR); Chan Jung Park, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 320 days.

(21) Appl. No.: 18/264,151

(22) PCT Filed: Jan. 28, 2022

(86) PCT No.: PCT/KR2022/001669
§ 371 (c)(1),
(2) Date: Aug. 3, 2023

(87) PCT Pub. No.: WO2022/169256
PCT Pub. Date: Aug. 11, 2022

(65) Prior Publication Data
US 2024/0100464 A1    Mar. 28, 2024

(30) Foreign Application Priority Data

Feb. 5, 2021  (KR) .................. 10-2021-0016815

(51) Int. Cl.
*B01D 46/62* (2022.01)
*B01D 39/20* (2006.01)
(Continued)

(52) U.S. Cl.
CPC ......... *B01D 46/62* (2022.01); *B01D 46/0005* (2013.01); *B01D 46/0006* (2013.01);
(Continued)

(58) Field of Classification Search
CPC .... B01D 46/30; B01D 46/62; B01D 39/2072; B01D 46/0005; B01D 46/0006;
(Continued)

(56) References Cited

FOREIGN PATENT DOCUMENTS

| CN | 110056996 A | 7/2019 |
|---|---|---|
| GB | 2 089 232 A | 6/1982 |

(Continued)

OTHER PUBLICATIONS

Extended European Search Report issued Sep. 13, 2024, in corresponding European Patent Application No. 22750005.5, 8 pages.
(Continued)

*Primary Examiner* — Robert Clemente
(74) *Attorney, Agent, or Firm* — Oblon, McClelland, Maier & Neustadt, L.L.P.

(57) ABSTRACT

An air filter comprises: a first filter frame in which a plurality of first chambers are formed; a second filter frame in which a plurality of second chambers are formed and which is arranged at the rear of the first filter frame; and a filter material which is accommodated in the plurality of first chambers and the plurality of second chambers to filter air, wherein the first filter frame and the second filter frame are arranged so that, when seen from the front, the center of each of the plurality of second chambers is out of line with the center of each of the plurality of first chambers, in the vertical direction.

10 Claims, 10 Drawing Sheets

(51) Int. Cl.
　　　*B01D 46/00* 　　　(2022.01)
　　　*B01D 46/30* 　　　(2006.01)
　　　*F24F 8/108* 　　　(2021.01)

(52) U.S. Cl.
　　　CPC .............. *B01D 46/30* (2013.01); *F24F 8/108* (2021.01); *B01D 39/2072* (2013.01)

(58) Field of Classification Search
　　　CPC ............ B01D 46/0036; B01D 46/0039; B01D 53/0407; B01D 53/0415; F24F 8/108; F24F 8/80
　　　See application file for complete search history.

(56) References Cited

FOREIGN PATENT DOCUMENTS

| GB | 2 148 736 A | 6/1985 |
|---|---|---|
| JP | 41-21265 Y | 10/1966 |
| JP | 10-263325 A | 10/1998 |
| JP | 11-47512 A | 2/1999 |
| JP | 2004-230057 A | 8/2004 |
| JP | 2004-255159 A | 9/2004 |
| KR | 10-2018-0005487 A | 1/2018 |

OTHER PUBLICATIONS

International Search Report mailed on May 11, 2022 in PCT/KR2022/001669 filed on Jan. 28, 2022 (6 pages).
Office Action issued Jul. 23, 2024, in corresponding Japanese Patent Application No. 2023-543397 (with English Translation), 6 pages.

AIR FILTER AND AIR PURIFIER COMPRISING SAME

TECHNICAL FIELD

The present disclosure relates to an air filter and an air purifier comprising same.

BACKGROUND ART

In general, an air purifier is a device for sucking polluted indoor air, and filtering out dust, odor particles, and the like contained in the air through a filter to purify the air into clean air. Such an air purifier can purify indoor air by sucking in and purifying the surrounding polluted air, and then discharging the purified clean air to the outside of the air purifier.

Meanwhile, the air purifier may include an air filter for filtering out dust, odor particles, and the like contained in the air introduced into the air purifier. In particular, among the air filters, a deodorization filter for filtering out odor particles contained in air is used in a manner that a filter frame is filled with a plurality of filter materials for filtering flowing air.

Korean Patent Application Publication No. 10-2018-0005487 "Air filter for air conditioning" (Patent Document 1) of the present applicant discloses an air filter capable of deodorizing air. In the air filter of Patent Document 1, an adsorption material is filled in air channels formed in each of a front frame and a rear frame, and air can be filtered by the adsorption material.

However, when viewing the air filter of Patent Document 1 from the front side thereof, an empty space of the air channel formed in the front frame and an empty space of the air channel formed in the rear frame partially overlap. That is, a region in which the adsorption material is not present on either side of the overlapping front and rear frames occurs. Due to this, a portion of the air passing through this region of the air filter cannot be filtered by the adsorption material, and consequently, there is a problem in that the purification efficiency of the air filter is lowered. In addition, the region of the overlapping empty space varies depending on the direction in which the air filter is erected with respect to the ground, so that when the air filter is installed while being rotated by mistake of a user or according to the user's needs, or the air purifier itself in which the air filter is installed is rotated, the purification efficiency of the air filter is not kept constant.

Accordingly, there is a need for a filter frame capable of maintaining constant purification efficiency without deterioration even when the air filter is rotated while minimizing the deterioration of the purification efficiency of the air filter.

PRIOR ART DOCUMENT (Patent Document 1) US Patent Application Publication 2018/0221805 (published on Aug. 9, 2018)

DETAILED DESCRIPTION OF INVENTION

Technical Problems

In view of the above, one embodiment of the present disclosure provides an air filter capable of preventing deterioration in purification efficiency of the air filter by minimizing a flow rate of air passing through the air filter without being filtered by a filter material.

Further, one embodiment of the present disclosure provides an air filter capable of maintaining a constant purification efficiency without deterioration even when the air filter is rotated.

Technical Solution

In accordance with one aspect of the present disclosure, there is provided an air filter comprising: a first filter frame in which a plurality of first chambers are formed; a second filter frame in which a plurality of second chambers are formed and which is disposed on a rear side of the first filter frame; and a filter material, for filtering air, accommodated in the plurality of first chambers and the plurality of second chambers, wherein the first filter frame and the second filter frame are disposed such that when viewed from a front side thereof, centers of the plurality of second chambers are offset from centers of the plurality of first chambers in an up-down direction, respectively.

Further each of the first chambers may have a first material space filled with the filter material and a first empty space, provided above the first material space, in which the filter material is absent when the first filter frame is erected vertically with respect to a ground, each of the plurality of second chambers may have a second material space filled with the filter material and a second empty space, provided above the second material space, in which the filter material is absent when the second filter frame is erected vertically with respect to the ground, and the first filter frame and the second filter frame may be disposed such that when viewed from the front side in a state in which the first filter frame and the second filter frame are erected vertically with respect to the ground, at least a portion of the first empty space overlaps at least a portion of the second material space, and at least a portion of the first material space overlaps at least a portion of the second empty space.

Further, the first filter frame and the second filter frame may be disposed such that the second empty space overlaps the first material space not to be exposed when viewed from the front side in a state in which the first filter frame and the second filter frame are erected vertically with respect to the ground, and the first empty space overlaps the second material space not to be exposed when the first filter frame and the second filter frame are viewed from a rear side thereof.

Further, the first filter frame and the second filter frame may be disposed such that when viewed from the front side, the centers of the plurality of second chambers are offset from the centers of the plurality of first chambers in a left-right direction, respectively.

Further, the first filter frame and the second filter frame may be disposed such that any one of the plurality of first chambers overlaps a portion of each of four or more second chambers adjacent thereto.

Further, each of the plurality of first chambers may have a first material space filled with the filter material and a first empty space, provided above the first material space, in which the filter material is absent when the first filter frame is erected vertically with respect to a ground, each of the plurality of second chambers may have a second material space filled with the filter material and a second empty space, provided above the second material space, in which the filter material is absent when the second filter frame is erected vertically with respect to the ground, and the first filter frame and the second filter frame may be disposed such that in a state in which the first filter frame and the second filter frame are erected vertically with respect to the ground, at least a portion of the first empty space overlaps the second material spaces of two second chambers, offset upward from the first chamber, among the plurality of second chambers, and at least a portion of the first material space overlaps the second empty spaces of two second chambers, offset downward from the first chamber, among the plurality of second chambers.

Further, the first chambers and the second chambers may have a rectangular shape of the same size when viewed from the front side.

Further, the first filter frame and the second filter frame may be disposed such that the centers of the plurality of second chambers are offset from the respective centers of the plurality of first chambers in a left-right direction when viewed from the front side, the second empty space overlaps the first material space not to be exposed when viewed from the front side in a state in which the first filter frame and the second filter frame are rotated by 90° in a direction perpendicular to a front-rear direction while being erected vertically with respect to the ground, and the first empty space overlaps the second material space not to be exposed when the first filter frame and the second filter frame are viewed from the rear side.

The filter material may be granular.

In accordance with one aspect of the present disclosure, there is provided an air purifier comprising: the air filter described above; and a blower for providing blowing force to cause outside air to flow through the air filter.

Effect of Invention

According to one embodiment of the present disclosure, it is possible to prevent deterioration in purification efficiency of the air filter by minimizing a flow rate of air passing through the air filter without being filtered by the filter material.

Further, according to one embodiment of the present disclosure, constant purification efficiency can be maintained without being deteriorated even when the air filter is rotated.

BEST MODE FOR CARRYING OUT THE INVENTION

Hereinafter, a specific embodiment of the present disclosure for implementing the idea of the present disclosure will be described in more detail with reference to the accompanying drawings.

However, in describing the present disclosure, when it is determined that detailed descriptions of known configurations or functions may obscure the gist of the present disclosure, the detailed descriptions will be omitted.

When an element is referred to as being 'connected' to, 'supported' by, or 'flowed' into another element, it should be understood that the element may be directly connected to, supported by, or flowed into the other element, but that other elements may exist between the elements.

The terms used in the present disclosure are only used for describing the specific embodiment, and are not intended to limit the present disclosure. Singular expressions include plural expressions unless the context clearly indicates otherwise.

The meaning of "including" used in the present specification specifies specific features, regions, integers, steps, operations, elements and/or components, and does not exclude the presence or addition of other specific features, regions, integers, steps, operations, elements, components, and/or groups.

In addition, in the present specification, expressions related to directions such as upper, lower, front, rear etc. are described based on the drawings, and it is declared in advance that they may be expressed differently if the direction of the object is changed. Meanwhile, in the present specification, an up-down direction, a left-right direction, and a front-rear direction may be coordinate directions shown in FIGS. 1 to 9.

Hereinafter, a specific configuration of an air purifier 1 according to one embodiment of the present disclosure will be described with reference to the drawings.

Figure 1:
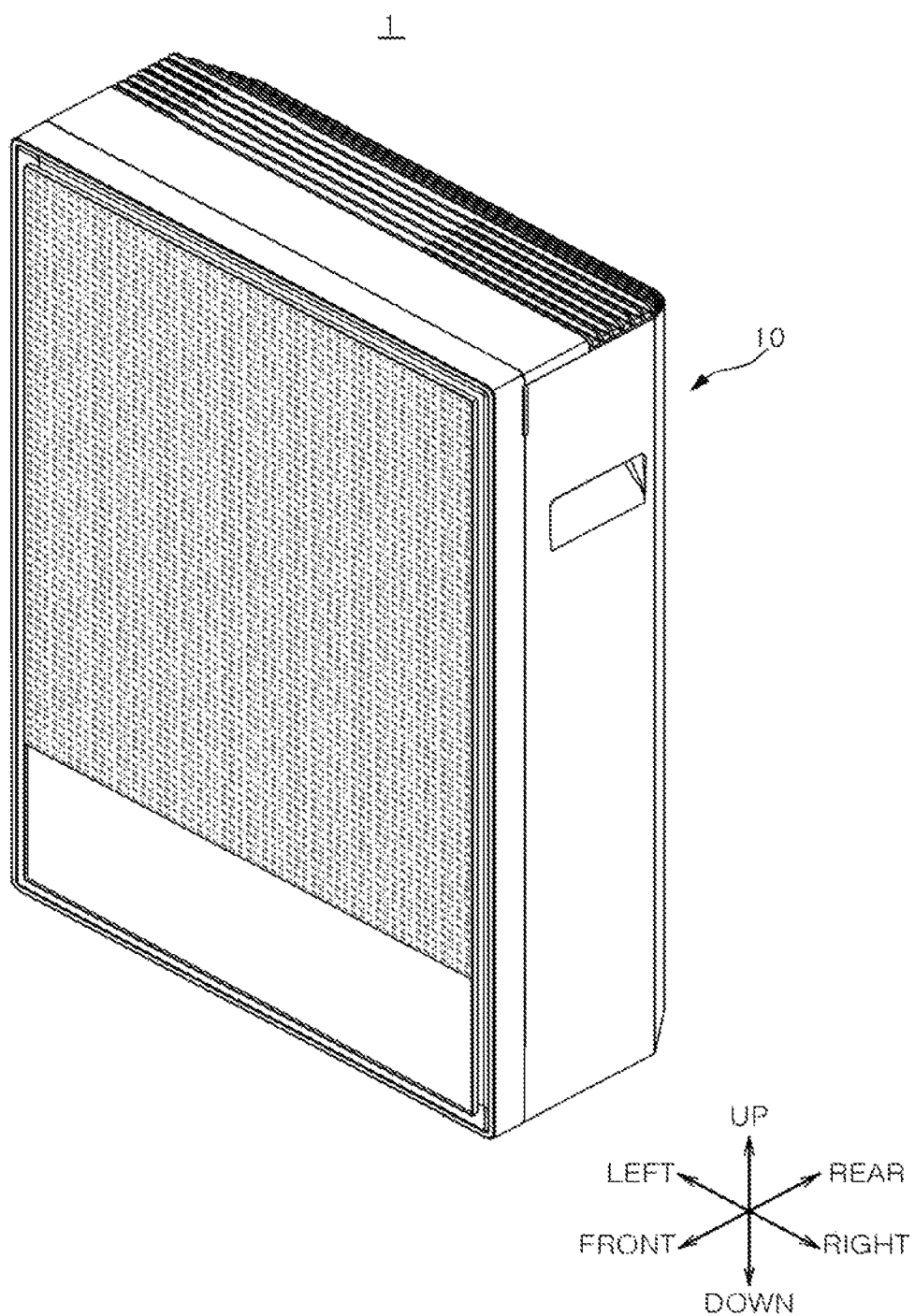
FIG. 1 is a perspective view showing an air purifier according to one embodiment of the present disclosure.
Figure 2:
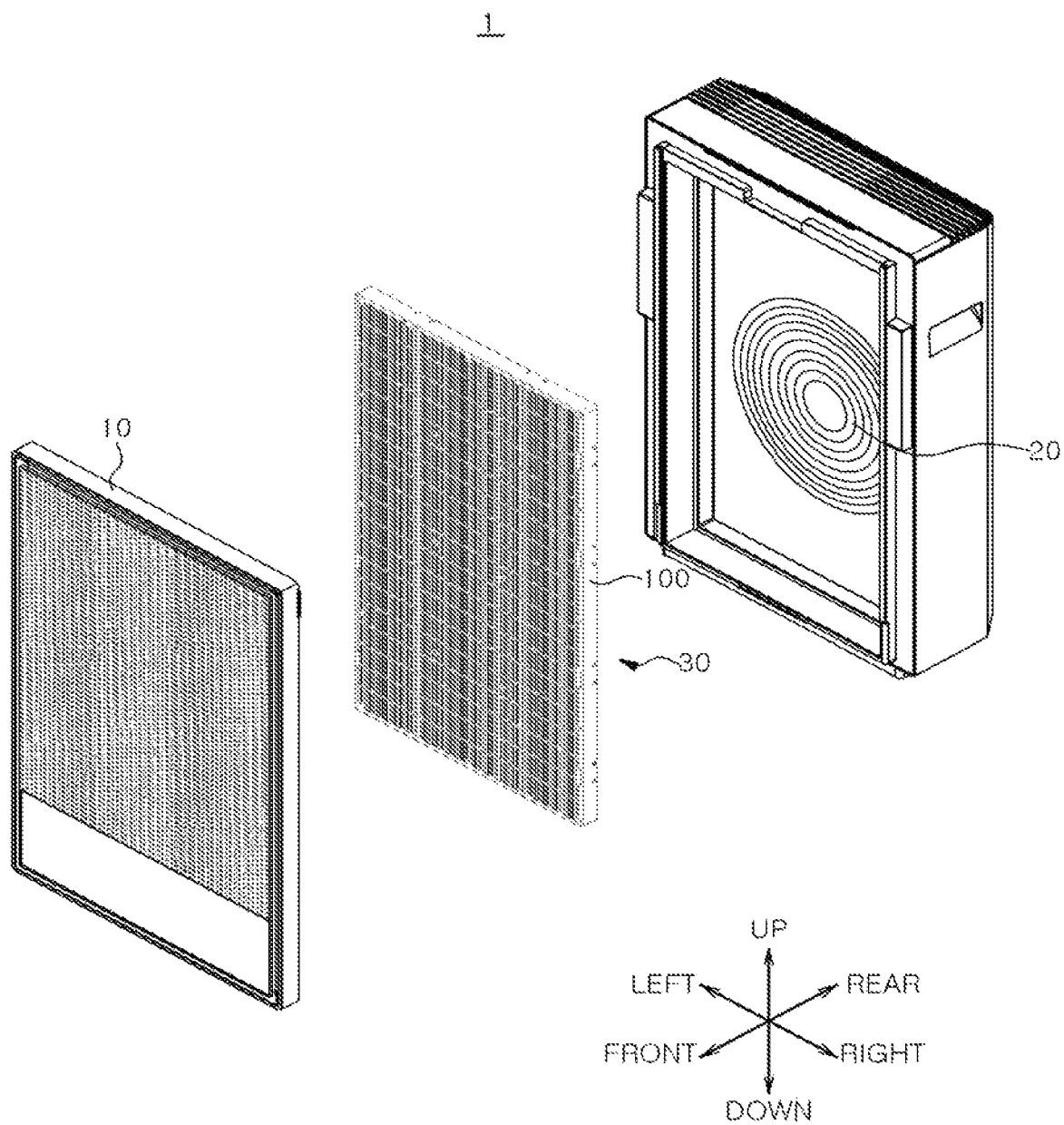
FIG. 2 is an exploded perspective view of the air purifier of FIG. 1.

Referring to FIGS. 1 and 2, the air purifier 1 according to one embodiment of the present disclosure can purify polluted air into clean air by filtering out dust, odor particles, and the like in the air introduced into the air purifier 1. In addition, the air purifier 1 can suck outside air into the air purifier and discharge clean air purified therein to the outside. The air purifier 1 may include a case 10, a blower 20, and an air filter 30.

The case 10 may support the blower 20 and the air filter 30, and may provide a space in which the blower 20 and the air filter 30 are accommodated. The case 10 may be provided to surround the blower 20 and the air filter 30.

The blower 20 may be driven to allow polluted air outside the air purifier 1 to be introduced into the air purifier 1. The blower 20 may provide blowing force to cause the introduced air to flow through the air filter 30 to be described later. In addition, the blower 20 may be driven to discharge air purified by the air filter 30 in the air purifier 1 to the outside.

The air filter 30 may filter air introduced from the outside of the air purifier 1 into clean air. For example, the air filter 30 may be an activated carbon deodorization filter (carbon filter). The air filter 30 may include a filter frame 100, a filter net 200, and a filter material 300

Figure 3:
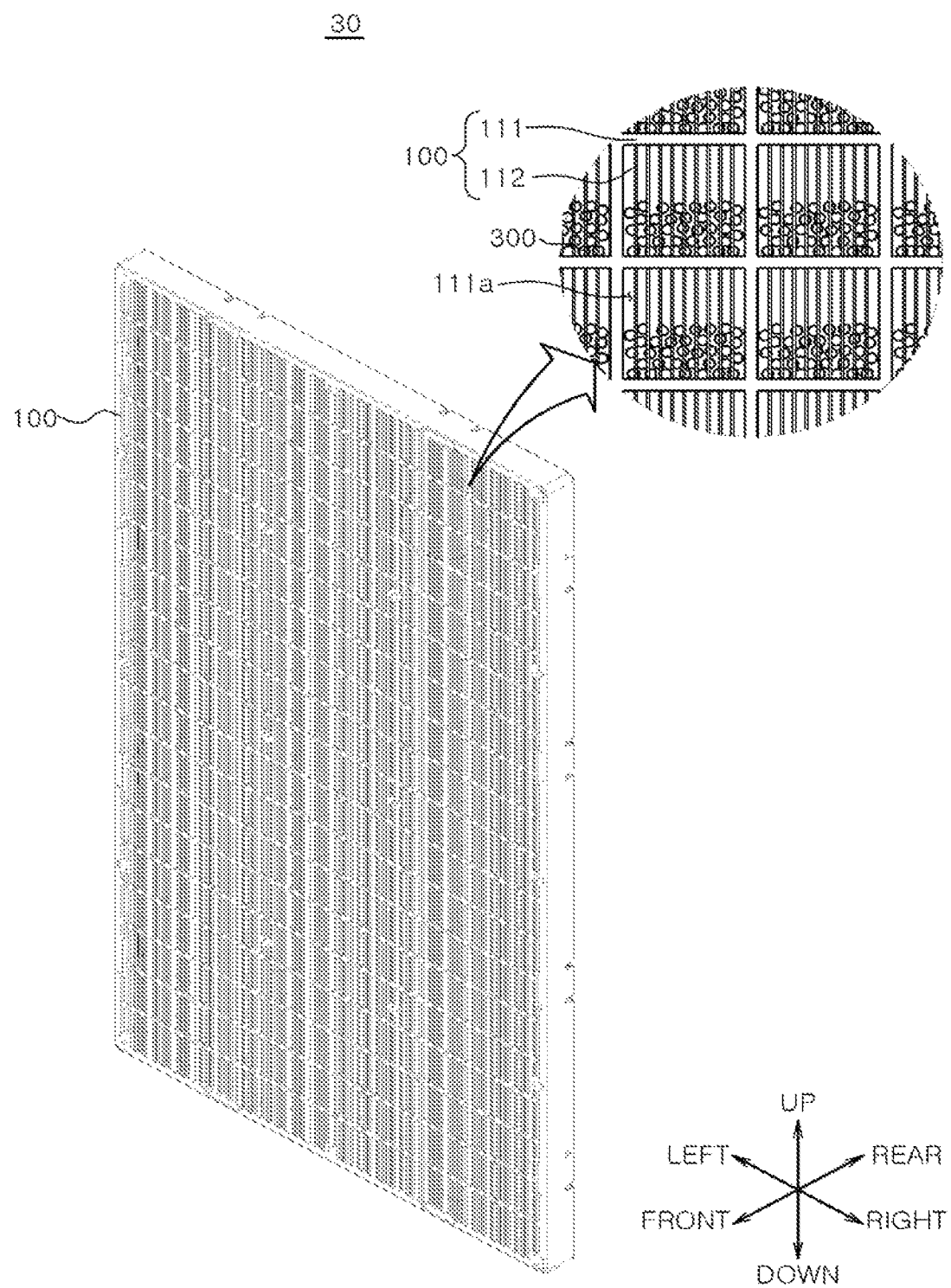
FIG. 3 shows a perspective view and a partially enlarged view of an air filter of FIG. 2.

Referring to FIG. 3, the filter frame 100 may accommodate the filter material 300, and may be supported by the case 10. The filter frame 100 may include a body 111 and a release preventing member 112.

A plurality of chambers 111a in each of which the filter material 300 can be accommodated may be formed in the body 111.

The chamber 111a may be a space at least partially surrounded by the body 111. A plurality of granular filter materials 300 may be accommodated in the chamber 111a. For example, when the entire space in the chamber 111a is filled with the filter material 300, since the differential pressure of air may increase and the purification efficiency may decrease, only a portion of the space in the chamber 111a may be filled with the filter material 300.

The release preventing member 112 may prevent the filtering material 300 accommodated in the chamber 111a from being released from the chamber 111a. The release preventing member 112 may include a plurality of release preventing members 112. In addition, the plurality of release preventing members 112 may extend in the same direction, for example, may extend in the up-down direction.

Both ends of the plurality of release preventing members 112 may be connected to the body 111, and the plurality of release preventing members 112 may be spaced apart so as not to be connected to each other. For example, the plurality of release preventing members 112 may be spaced apart from each other in the left-right direction. In this case, the release preventing member 112 may be supported by the body 111 only at both ends in the up-down direction without being connected to the adjacent release preventing members 112 on both sides in the left-right direction. In addition, the plurality of release preventing members 112 may be formed of an injection moldable material and may be integrally connected to the body 111 through injection molding.

In addition, the plurality of release preventing members 112 may be provided such that a distance therebetween is smaller than a minimum width of the granular filter material 300. Due to this, the filter material 300 accommodated in the chamber 111a can be accommodated in the chamber 111a by the plurality of release preventing members 112 without being released to the outside of the chamber 111a.

Figure 4:
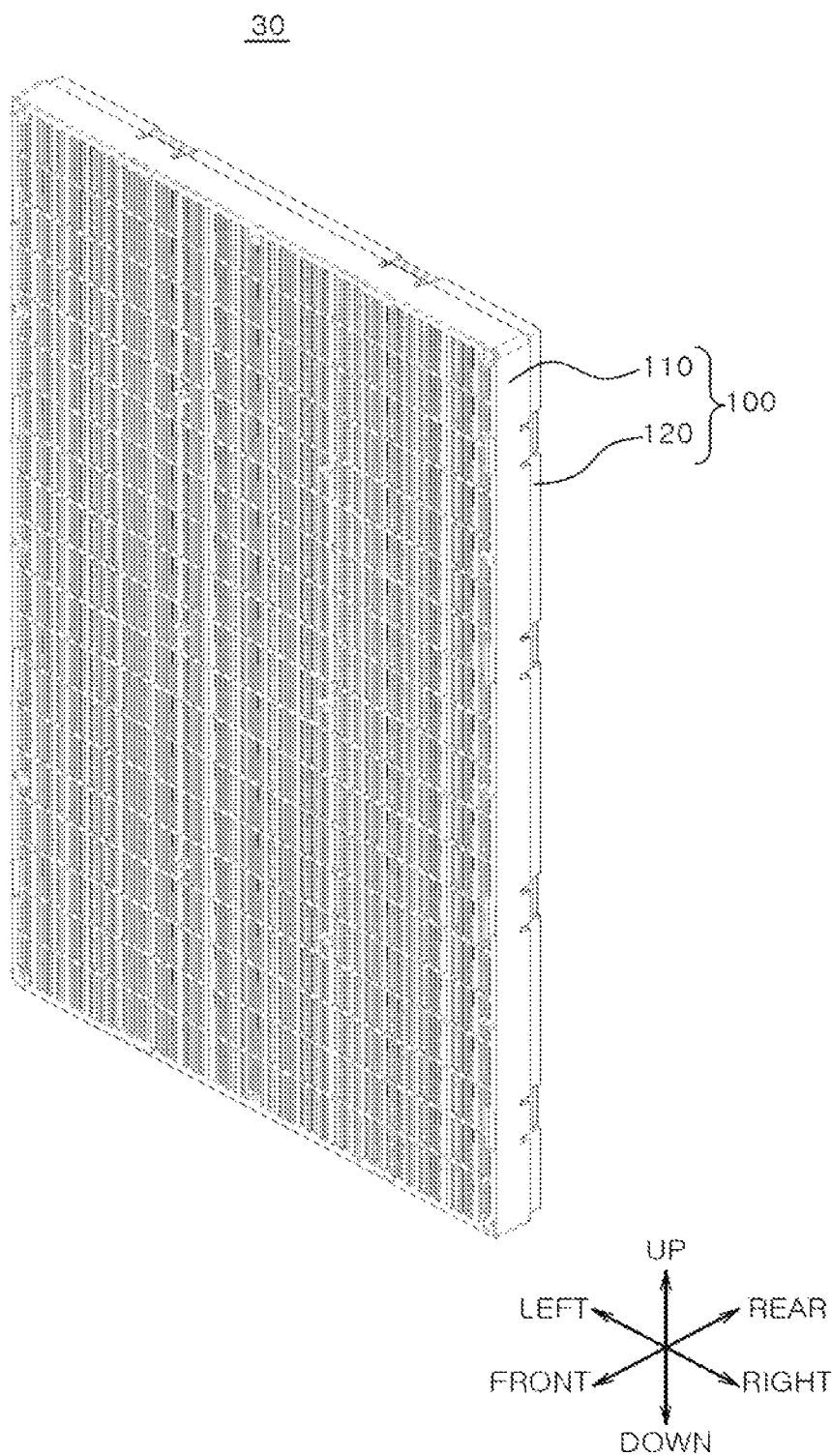
FIG. 4 is a perspective view of the air filter when a plurality of filter frames of FIG. 3 is provided.

Meanwhile, referring to FIG. 4, the filter frame 100 may include a plurality of filter frames, and the plurality of filter frames 100 may include a first filter frame 110 and a second filter frame 120. Hereinafter, it is described that the filter frame 100 is provided in two pieces and includes the first filter frame 110 and the second filter frame 120, but this is only an example, and the filter frame 100 may be provided in three or more pieces. In addition, the reference numerals of the body 111, the release preventing member 112, and the chamber 111a described above may refer to a first body 111, a first release preventing member 112, and a first chamber 111a, which will be described later, respectively.

Figure 5:
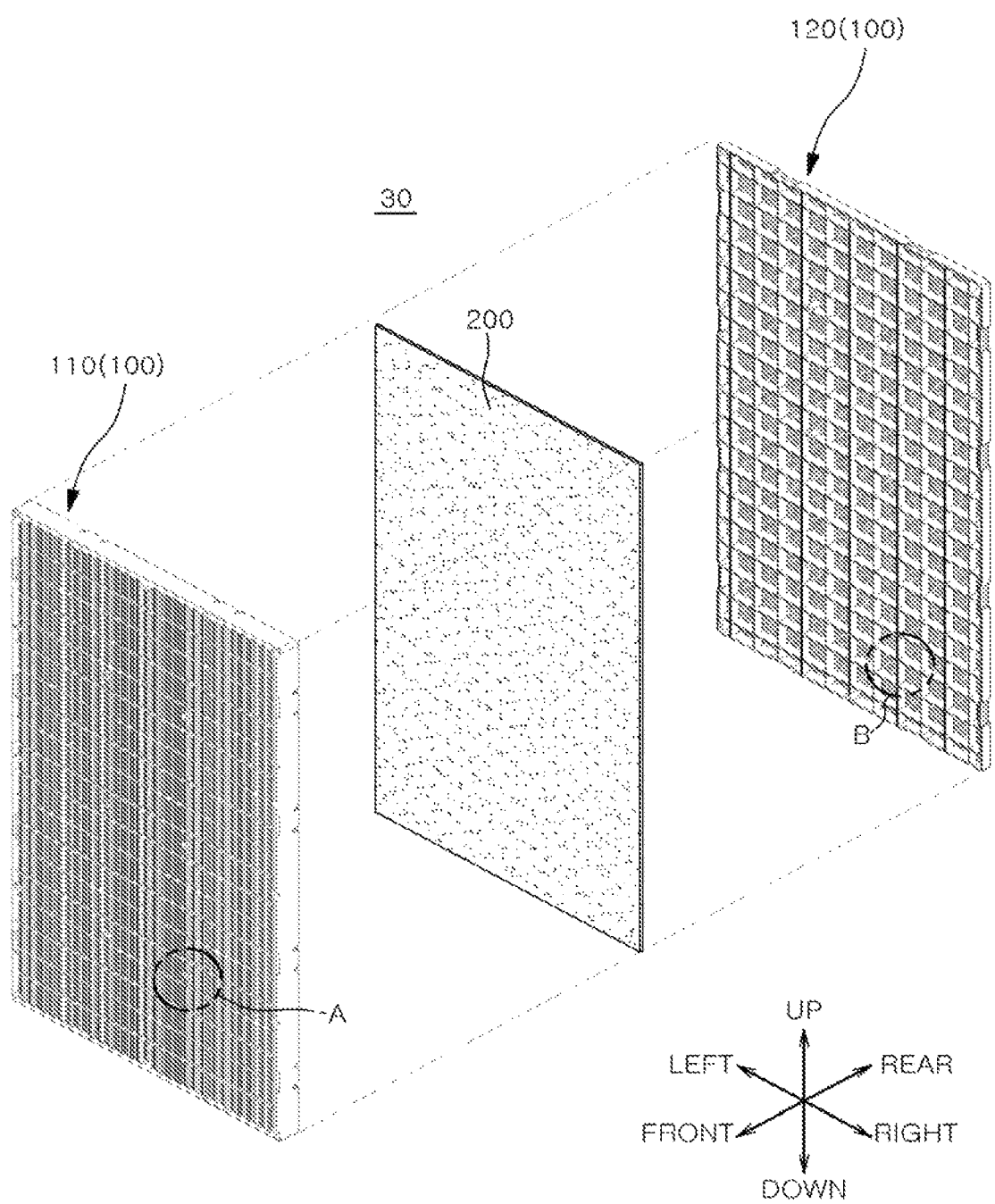
FIG. 5 is an exploded perspective view of the air filter of FIG. 4.
Figure 6:
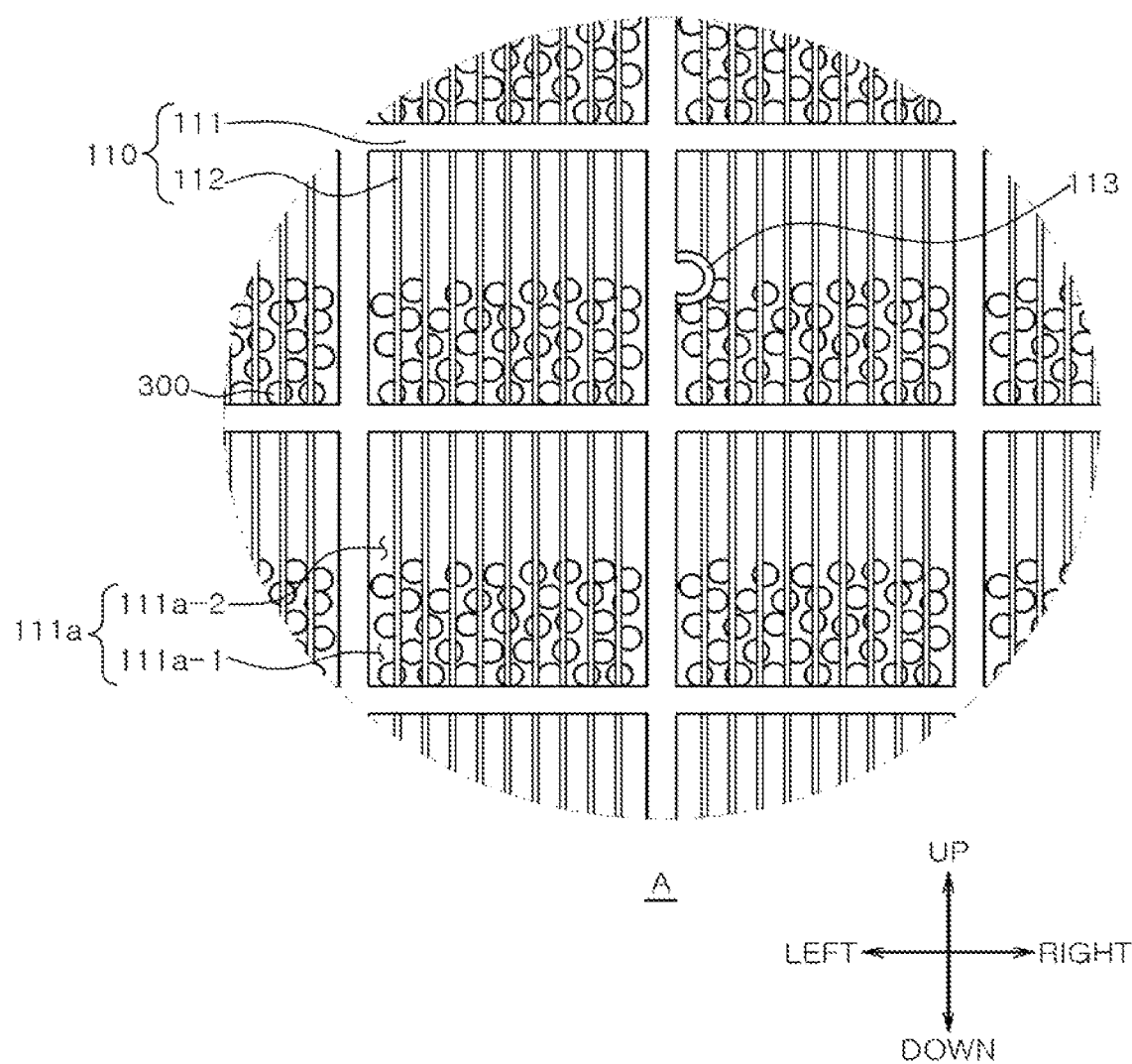
FIG. 6 is an enlarged view of part A in FIG. 5.

Referring to FIGS. 5 and 6, the first filter frame 110 may be disposed on one side (e.g., the front side in FIG. 5) of the filter net 200. The first filter frame 110 may include the first body 111 and the first release preventing member 112.

A plurality of first chambers 111a in each of which the filter material 300 can be accommodated may be formed in the first body 111.

The first chamber 111a may be a space at least partially surrounded by the first body 111. The filter material 300 may be accommodated in the first chamber 111a. In addition, the first chamber 111a may have, for example, a rectangular shape. The first chamber 111a may include a first material space 111a-1 and a first empty space 111a-2.

The first material space 111a-1 may be a space filled with the filter material 300 in the first chamber 111a when the first filter frame 110 is erected vertically with respect to a ground. In this case, the first material space 111a-1 may include not only a space occupied by the filter material 300 in the first chamber 111a but also a minute space formed between the filter materials 300.

The first empty space 111a-2 may be a space in which the filter material 300 is absent in the first chamber 111a when the first filter frame 110 is erected vertically with respect to the ground. The first empty space 111a-2 may be provided above the first material space 111a-1 since the filter material 300 is located in a lower portion of the first chamber 111a by gravity when the first filter frame 110 is erected vertically with respect to the ground.

As such, the first material space 111a-1 and the first empty space 111a-2 may be partitioned by the filter material 300. In other words, the space in the first chamber 111a may be divided into the first material space 111a-1 and the first empty space 111a-2 by the space occupied by the filter material 300 in the first chamber 111a. In addition, the first material space 111a-1 may include not only the space occupied by the filter material 300 in the first chamber 111a but also a minute space formed between the filter materials 300.

In addition, the spaces occupied by the first material space 111a-1 and the first empty space 111a-2 in the first chamber 111a may be changed in response to the movement of the filter material 300 by gravity when the first filter frame 110 is rotated.

The first release preventing member 112 may prevent the filter material 300 accommodated in the first chamber 111a from being released from the first chamber 111a. The first release preventing member 112 may include a plurality of first release preventing members. In addition, the plurality of first release preventing members 112 may extend in the same direction, for example, in the up-down direction.

Both ends of the plurality of first release preventing members 112 may be connected to the first body 111. For example, the plurality of first release preventing members 112 may be integrally connected to the first body 111 through injection molding. In addition, the ends of the plurality of first release preventing members 112 may be spaced apart from each other so as not to be connected to each other. For example, the plurality of first release preventing members 112 may be spaced apart from each other in the left-right direction. In this case, the first release preventing member 112 is not connected to the adjacent first release preventing members 112 on both sides in the left-right direction, and only both ends in the up-down direction may be supported by the first body 111. That is, a configuration for connecting the adjacent first release preventing members 112 in the left-right direction may be omitted.

Accordingly, the plurality of first release preventing members 112 and the first body 111 can be easily manufactured through injection molding, which reduces the manufacturing costs. In addition, since the plurality of first release preventing members 112 extend in the same direction and a configuration for connecting them to each other is omitted, differential pressure of air passing through the first filter frame 110 can be reduced.

In the above, the case where the plurality of first release preventing members 112 extend in the up-down direction has been described, but the extending direction is not limited to the up-down direction and the plurality of first release preventing members 112 may extend in the left-right direction as another example. In this case, the plurality of first release preventing members 112 may be disposed spaced apart in the up-down direction, and are not connected to the adjacent first release preventing members 112 on both sides in the up-down direction, and only the ends in the left-right direction may be supported by the first body 111.

Figure 7:
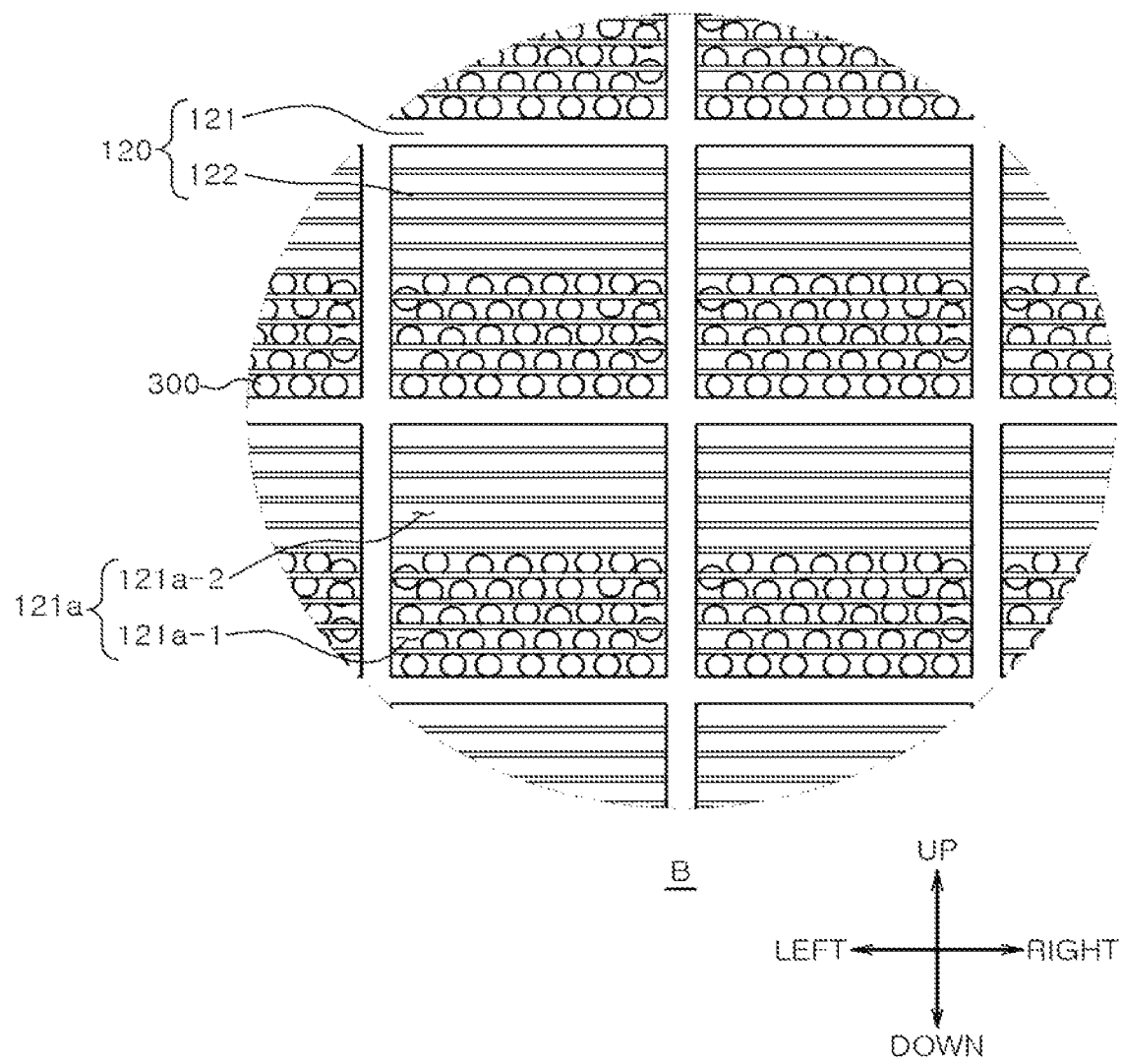
FIG. 7 is an enlarged view of part B in FIG. 5.

Referring to FIGS. 5 and 7, the second filter frame 120 may be disposed on the other side (e.g., the rear side in FIG. 5) of the filter net 200. The second filter frame 120 may include a second body 121 and a second release preventing member 122.

A plurality of second chambers 121a in each of which the filter material 300 can be accommodated may be formed in the second body 121.

The second chamber 121a may be a space at least partially surrounded by the second body 121. The filter material 300 may be accommodated in the second chamber 121a. Further, the second chamber 121a may have, for example, a rectangular shape having the same size as the first chamber 111a. The second chamber 121a may include a second material space 121a-1 and a second empty space 121a-2.

The second material space 121a-1 may be a space filled with the filter material 300 in the second chamber 121a when the second filter frame 120 is erected vertically with respect to the ground. In this case, the second material space 121a-1 may include not only a space occupied by the filter material 300 in the second chamber 121a but also a minute space formed between the filter materials 300.

The second empty space 121a-2 may be a space in which the filter material 300 is absent in the second chamber 121a when the second filter frame 120 is erected vertically with respect to the ground. The second empty space 121a-2 may be provided above the second material space 121a-1 since the filter material 300 is located in a lower portion of the second chamber 121a by gravity when the second filter frame 120 is erected vertically with respect to the ground.

As such, the second material space 121a-1 and the second empty space 121a-2 may be partitioned by the filter material 300. In other words, the space in the second chamber 121a may be divided into the second material space 121a-1 and the second empty space 121a-2 by the space occupied by the filter material 300 in the second chamber 121a. In addition, the second material space 121a-1 may include not only the space occupied by the filter material 300 in the second chamber 121a but also a minute space formed between the filter materials 300. In addition, the spaces occupied by the second material space 121a-1 and the second empty space 121a-2 in the second chamber 121a may be changed in response to the movement of the filter material 300 by gravity when the second filter frame 120 is rotated.

The second release preventing member 122 may prevent the filter material 300 accommodated in the second chamber 121a from being released from the second chamber 121a. The second release preventing member 122 may include a plurality of second release preventing members. In addition, the plurality of second release preventing members 122 may extend in the same direction, for example, in the left-right direction.

Both ends of the plurality of second release preventing members 122 may be connected to the second body 121. For example, the plurality of second release preventing members 122 may be integrally connected to the second body 121 through injection molding. In addition, the ends of the plurality of second release preventing members 122 may be spaced apart from each other so as not to be connected to each other. For example, the plurality of second release preventing members 122 may be spaced apart from each other in the up-down direction. In this case, the second release preventing member 122 is not connected to the adjacent second release preventing members 122 on both sides in the up-down direction, and only both ends in the left-right directions may be supported by the second body 121. That is, a configuration for connecting the adjacent second release preventing members 122 in the up-down direction may be omitted.

Accordingly, the plurality of second release preventing members 122 and the second body 121 can be easily manufactured through injection molding, which reduces the manufacturing costs. In addition, since the plurality of second release preventing members 122 extend in the same direction and a configuration for connecting them to each other is omitted, differential pressure of air passing through the second filter frame 120 can be reduced.

In the above, the case where the plurality of second release preventing members 122 extend in the left-right direction has been described, but the extending direction is not limited to the left-right direction and the plurality of second release preventing members 122 may extend in the up-down direction as another example. In this case, the plurality of second release preventing members 122 may be spaced apart in the left-right direction, and are not connected to the adjacent second release preventing members 122 on both sides in the left-right direction, and only the ends in the up-down direction may be supported by the second body 121. Meanwhile, the direction in which the plurality of second release preventing members 122 extend may be substantially perpendicular to the direction in which the plurality of first release preventing members 112 extend, but is not limited thereto and may be the same direction.

Meanwhile, the first filter frame 110 and the second filter frame 120 may be configured such that a flow rate of air passing through the air filter 30 without being filtered by the filter material 300 is minimized. For example, the first filter frame 110 and the second filter frame 120 may be disposed so that the centers of the plurality of first chambers 111a are offset from the centers of the plurality of second chambers 121a in the up-down and left-right directions, respectively. Hereinafter, the description will be made on the assumption that the first filter frame 110 and the second filter frame 120 are erected vertically with respect to the ground.

Figure 8:
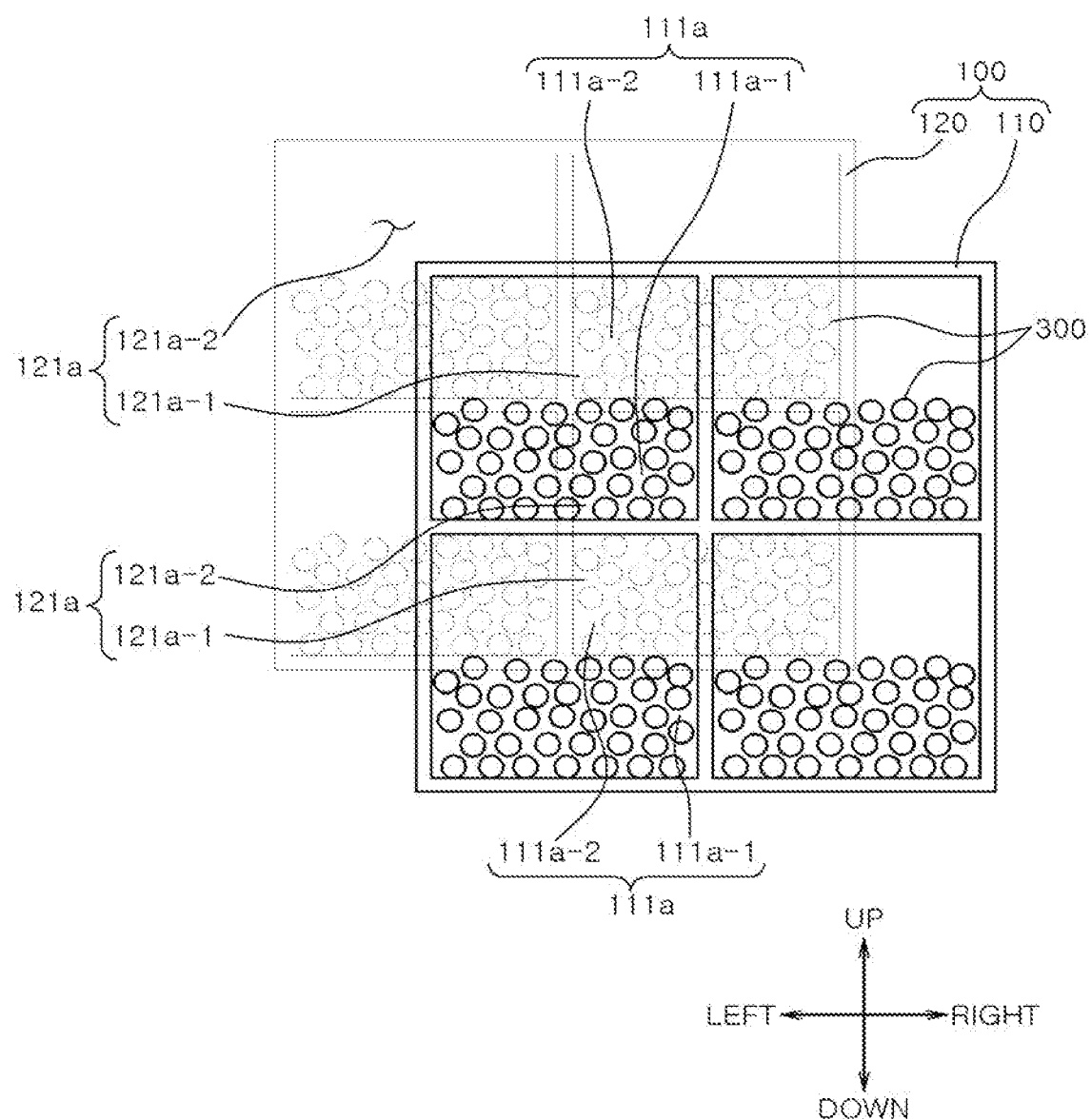
FIG. 8 is a view showing a front view when a part of a first filter frame and a part of a second filter frame of FIG. 4 are overlapped.
Figure 9:
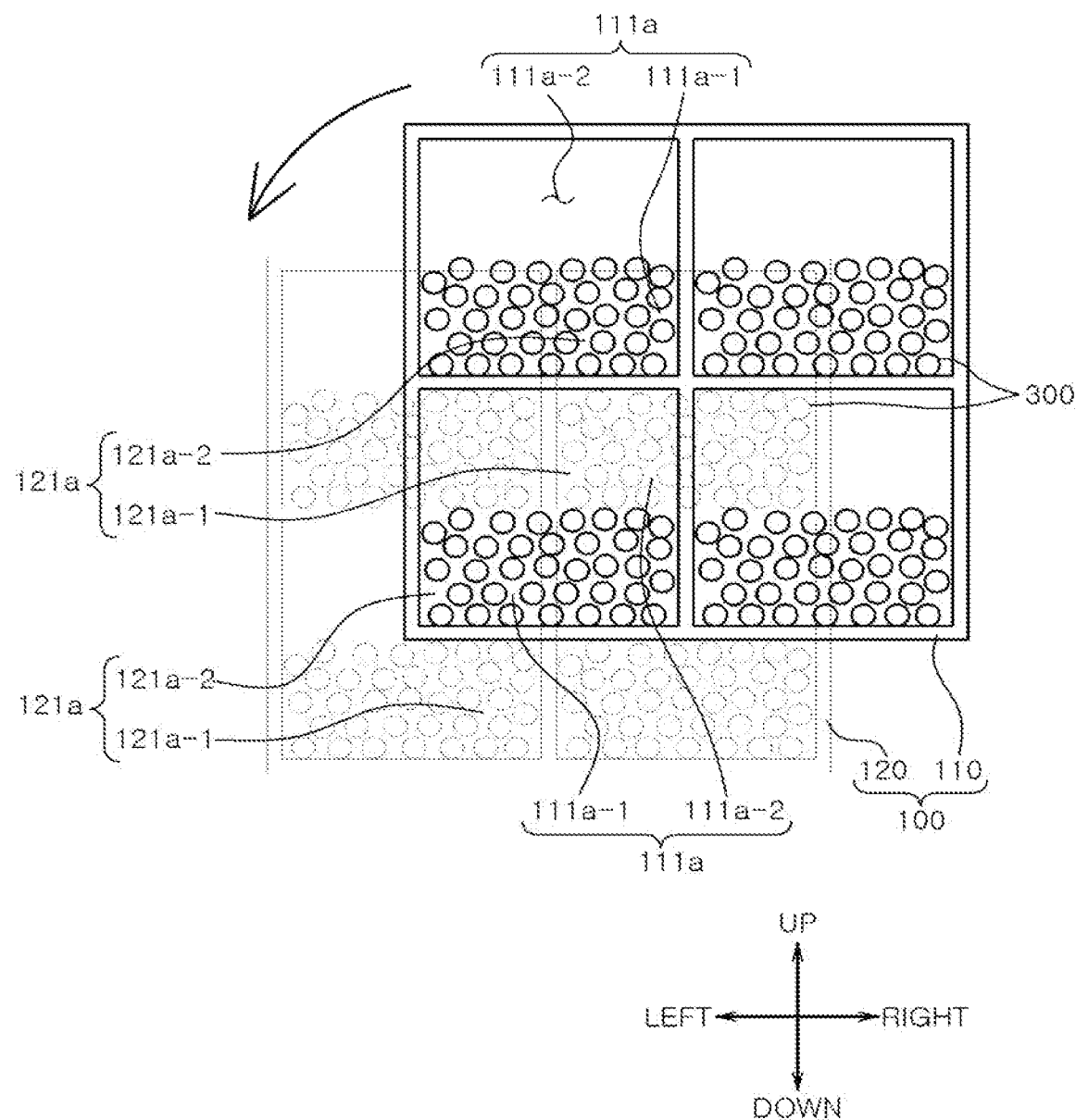
FIG. 9 is a view showing a state in which the first filter frame and the second filter frame of FIG. 8 are rotated by 90°.

Referring to FIG. 8, the first filter frame 110 and the second filter frame 120 may be disposed so that air passing through the air filter 30 flows through the first material space 111a-1 or the second material space 121a-1. For example, the first filter frame 110 and the second filter frame 120 are disposed so that at least a portion of the first empty space 111a-2 overlaps with at least a portion of the second material space 121a-1, and at least a portion of the first material space 111a-1 overlaps with at least a portion of the second empty space 121a-2. That is, the first filter frame 110 and the second filter frame 120 may be disposed such that the first empty space 111a-2 and the second empty space 121a-2 do not overlap. In this case, when viewed from the front side, the second empty space 121a-2 overlaps the first material space 111a-1 and is not exposed to the front side. Further, when viewed from the rear side, the first empty space 111a-2 overlaps the second material space 121a-1 and is not exposed to the rear side. Accordingly, air passing through the air filter 30 may be filtered by the filter material 300 filled in the first material space 111a-1 or the second material space 121a-1.

As a more specific example, the first filter frame 110 and the second filter frame 120 may be disposed such that the first chamber 111a partially overlaps each of four or more second chambers 121a adjacent thereto. In this case, at least a portion of the first empty space 111a-2 overlaps the second material spaces 121a-1 of the two second chambers 121a which are offset upward from the first chamber 111a among the plurality of second chambers 121a. That is, the first empty space 111a-2 overlaps the two second material spaces 121a-1, in addition, at least a portion of the first material space 111a-1 overlaps the second empty spaces 121a-2 of the two second chambers 121a which are offset downward from the first chamber 111a among the plurality of second chambers 121a. That is, the first material space 111a-1 overlaps the two second empty spaces 121a-2.

As such, the air filter 30 is configured such that the first empty space 111a-2 overlaps the second material space 121a-1, and the second empty space 121a-2 overlaps the first material space 111a-1, so that the flow rate of air that does not pass through the filter material 300 can be minimized, and the air filtration efficiency can be increased.

In addition, the air filter 30 is configured such that the first chamber 111a and the second chamber 121a are formed in a rectangular shape, and the first chamber 111a overlaps four second chambers 121a adjacent thereto, so even when the air filter 30 is rotated, the air filtration efficiency is not deteriorated. For example, referring to FIG. 9, even when the first filter frame 110 and the second filter frame 120 are rotated by 90° in a direction perpendicular to the front-rear direction, the first empty space 111a-2 may overlap the second material space 121a-1, and the second empty space 121a-2 may overlap the first material space 111a-1. Accordingly, even when the air filter 30 is rotated, the overlap between the first empty space 111a-2 and the second empty space 121a-2 does not occur, and the air purifying efficiency of the air filter 30 can be maintained without deterioration.

Referring back to FIG. 5, the filter net 200 may prevent the filter material 30 from being released from the first chamber 111a and the second chamber 121a. The filter net 200 may be disposed between the first filter frame 110 and the second filter frame 120. In other words, the plurality of first chambers 111a may be disposed on one side of the filter net 200, and the plurality of second chambers 121a may be disposed on the other side. The filter net 200 may have holes (not shown) through which air may pass, and may be formed of a mesh structure, for example. In this case, the hole formed in the filter net 200 may be smaller than the minimum width of the granular filter material 300.

In addition, the filter net 200 may partition the first chamber 111a and the second chamber 121a so that the filter materials 30 filled in the first chamber 111a and the second chamber 121a are not mixed. Accordingly, even when the air filter 30 is rotated, the amount of the filter materials 300 filled in the first chamber 111a and the second chamber 121a can be maintained. In addition, the filter net 200 may be connected to the first filter frame 110 and the second filter frame 120 between the first filter frame 110 and the second filter frame 120.

The filter material 300 may filter air introduced into the air purifier 1 from the outside into clean air. The filter material 300 may be provided in the form of a plurality of granules, and the filter material 300 may be accommodated in the plurality of first chambers 111a and the plurality of second chambers 121a. In addition, the filter material 300 may be exposed to the outside through gaps between the plurality of release preventing members 112.

The filter material 300 may be granular and have a predetermined width. In this case, the granular filter material 300 means a grain, and may be a concept including a pellet type as well as a round type. When the granular filter material 300 is the round type, the particle diameter of the filter material 300 may be 1.5 mm to 3.5 mm. Further, the minimum width and maximum width of the filter material 300 may be the same. However, this is only an example, and the filter material 300 may be provided in the pellet type having a circular cross section with a diameter of 1.5 mm to 3.5 mm and a height of 2.5 mm to 11 mm. In this case, the minimum width of the filter material 300 may be the diameter of the circular cross section of the pellet. In the present specification, the minimum width of the filter material 300 means a smallest width among the widths of the filter material 300 on an imaginary line extending in one direction and passing through the center of the filter material 300. Meanwhile, the filter material 300 may adsorb and remove contaminants in the air, and may be, for example, activated carbon. However, the present disclosure is not limited to the above, and the known material capable of adsorbing contaminants may be used as the filter material 300.

In the air filter 30 according to one embodiment of the present disclosure, since the release preventing member 112 can be easily manufactured together with the body 111 through injection molding, the manufacturing costs can be reduced and the manufacturing process can be simplified.

In addition, the plurality of release preventing members 112 are connected to the body 111 only at both ends, and the configuration for connecting them to each other is omitted, which reduces the differential pressure, reduces the manufacturing costs and simplifies the manufacturing process.

Further, since the first release preventing member 112 and the second release preventing member 122 extend in directions perpendicular to each other, the differential pressure of the air passing through the filter frame 100 can be reduced.

Meanwhile, since the air filter 30 is configured such that the first empty space 111a-2 overlaps the second material space 121a-1, and the second empty space 121a-2 overlaps the first material space 111a-1, it is possible to minimize the flow rate of air that is not filtered by the filter material 300, which increases the air filtration efficiency.

In addition, even when the air filter 30 is rotated upon installation, the overlap between the first empty space 111a-2 and the second empty space 121a-2 does not occur, and the air purifying efficiency of the air filter 30 can be maintained without decreasing.

Figure 10:
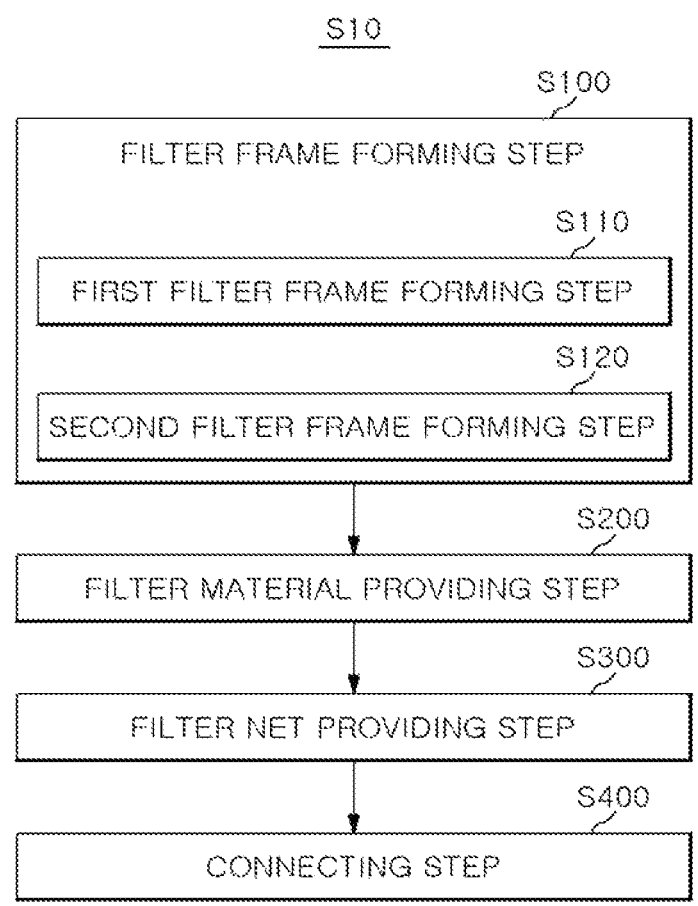
FIG. 10 is a flowchart sequentially illustrating a method of manufacturing the air filter according to one embodiment of the present disclosure.

Hereinafter, an air filter manufacturing method S10 of manufacturing the air filter 30 according to one embodiment of the present disclosure will be described with reference to FIG. 10.

In the air filter manufacturing method S10, the air filter 30 may be manufactured by connecting the filter frame 100 formed through injection molding and the filter net 200. Such an air filter manufacturing method S10 may include a filter frame forming step S100, a filter material providing step S200, a filter net providing step S300, and a connecting step S400.

In the filter frame forming step S100, the filter frame 100 may be formed by integrally injection molding the body 111 in which the chamber 111a is formed and the plurality of release preventing members 112. The filter frame 100 formed in the filter frame forming step S100 is injection molded so that both ends of the plurality of release preventing members 112 are connected to the body 111. Accordingly, the filter material 300 provided in the chamber 111a may not be released from the chamber 111a in the filter material providing step S300. The filter frame forming step S100 may include a first filter frame forming step S110 and a second filter frame forming step S120.

In the first filter frame forming step S110, the first filter frame 110 may be formed through injection molding by integrally injection molding the first body 111 in which the first chamber 111a is formed and the plurality of first release preventing members 112 together.

In the second filter frame forming step S120, the second filter frame 120, including the second body 121 in which the second chamber 121a is formed and the plurality of second release preventing members 122 integrally connected, may be formed through injection molding.

Meanwhile, the filter frame 100 formed in the filter frame forming step S100 may include an injection moldable material, for example, polypropylene (PP). In addition, the injection moldable material may be injected in the first filter frame 110 and the second filter frame 120 through an injection molding injection hole 113. In the filter frame forming step S100, the filter frame 100 may be injection molded under a temperature condition of 190° C. to 250° C. and a pressure condition of 35 bar to 40 bar. In addition, the injection molding time including the cooling time and the injection time in the filter frame forming step S100 may be 25 to 35 seconds.

In the filter material providing step S200, the filter material 300 may be provided to the plurality of first chambers 111a and the filter material 300 may be provided to the plurality of second chambers 121a.

In the filter net providing step S300, the filter net 200 having a mesh structure may be provided.

In the connecting step S400, the filter net 200 may be connected to the first filter frame 110 and the second filter frame 120 between the first filter frame 110 and the second filter frame 120. In the connecting step S400, the filter net 200 is configured to partition the first chamber 111a and the second chamber 121a so as to prevent the filter material 300 accommodated in the first chamber 111a and the filter material 300 accommodated in the second chamber 121a from being mixed with each other.

Although the embodiments of the present disclosure have been described as specific embodiments, these are merely examples. The present disclosure is not limited to the above, and should be interpreted as having the broadest scope according to the technical idea disclosed in the present specification. Those skilled in the art may combine/substitute the disclosed embodiments to implement a pattern of a shape not disclosed, but this also does not depart from the scope of the present disclosure. In addition, those skilled in the art may easily change or modify the disclosed embodiments based on the present specification, and it is clear that such changes or modifications also fall within the scope of the present disclosure.

What is claimed is:

1. An air filter comprising:
a first filter frame in which a plurality of first chambers are formed;
a second filter frame in which a plurality of second chambers are formed and which is disposed on a rear side of the first filter frame; and
a filter material, for filtering air, accommodated in the plurality of first chambers and the plurality of second chambers,
wherein the first filter frame and the second filter frame are disposed such that when viewed from a front side thereof, centers of the plurality of second chambers are offset from centers of the plurality of first chambers in an up-down direction, respectively,
wherein the filter material accommodated in the plurality of first chambers and the filter material accommodated in the plurality of second chambers are not overlapped when viewed from a front side of the air filter, and
wherein when the first filter frame and the second filter frame are rotated 90° about an axis extending in a front and rear direction of the air filter while being erected vertically with respect to a ground, the filter material accommodated in the plurality of first chambers and the filter material accommodated in the plurality of second chambers are not overlapped when viewed from a front side of the air filter.

2. The air filter of claim 1, wherein when the first filter frame is erected vertically with respect to the ground, each of the first chambers has a first material space filled with the filter material and a first empty space, provided above the first material space, in which the filter material is absent,
wherein when the second filter frame is erected vertically with respect to the ground, each of the plurality of second chambers has a second material space filled with the filter material and a second empty space, provided above the second material space, in which the filter material is absent, and
wherein the first filter frame and the second filter frame are disposed such that when viewed from the front side in a state in which the first filter frame and the second filter frame are erected vertically with respect to the ground, at least a portion of the first empty space overlaps at least a portion of the second material space, and at least a portion of the first material space overlaps at least a portion of the second empty space.

3. The air filter of claim 2, wherein the first filter frame and the second filter frame are disposed such that the second empty space overlaps the first material space not to be exposed when viewed from the front side in a state in which the first filter frame and the second filter frame are erected vertically with respect to the ground, and the first empty space overlaps the second material space not to be exposed when the first filter frame and the second filter frame are viewed from a rear side thereof.

4. The air filter of claim 1, wherein the first filter frame and the second filter frame are disposed such that when viewed from the front side, the centers of the plurality of second chambers are offset from the centers of the plurality of first chambers in a left-right direction, respectively.

5. The air filter of claim 4, wherein the first filter frame and the second filter frame are disposed such that any one of the plurality of first chambers overlaps a portion of each of four or more second chambers adjacent thereto.

6. The air filter of claim 5, wherein when the first filter frame is erected vertically with respect to a ground, each of the plurality of first chambers has a first material space filled with the filter material and a first empty space, provided above the first material space, in which the filter material is absent,
wherein when the second filter frame is erected vertically with respect to the ground, each of the plurality of second chambers has a second material space filled with the filter material and a second empty space, provided above the second material space, in which the filter material is absent, and
wherein the first filter frame and the second filter frame are disposed such that in a state in which the first filter frame and the second filter frame are erected vertically with respect to the ground, at least a portion of the first empty space overlaps the second material spaces of two second chambers, offset upward from the first chamber, among the plurality of second chambers, and at least a portion of the first material space overlaps the second empty spaces of two second chambers, offset downward from the first chamber, among the plurality of second chambers.

7. The air filter of claim 1, wherein the first chambers and the second chambers have a rectangular shape of the same size when viewed from the front side.

8. The air filter of claim 3, wherein the first filter frame and the second filter frame are disposed such that the centers of the plurality of second chambers are offset from the respective centers of the plurality of first chambers in a left-right direction when viewed from the front side, the second empty space overlaps the first material space not to be exposed when viewed from the front side in a state in which the first filter frame and the second filter frame are rotated by 90° in a direction perpendicular to a front-rear direction while being erected vertically with respect to the ground, and the first empty space overlaps the second material space not to be exposed when the first filter frame and the second filter frame are viewed from the rear side.

9. The air filter of claim 1, wherein the filter material is granular.

10. An air purifier comprising:
the air filter according to claim 1; and
a blower for providing blowing force to cause outside air to flow through the air filter.

* * * * *